(12) United States Patent
Li (10) Patent No.: US 9,174,661 B2
(45) Date of Patent: Nov. 3, 2015

(54) ARMREST FOLDING DEVICE FOR A FOLDABLE STROLLER

(71) Applicant: WONDERLAND NURSERYGOODS COMPANY LIMITED, Central, Hong Kong (CN)

(72) Inventor: Fang-Ming Li, Hong Kong (CN)

(73) Assignee: Wonderland Nurserygoods Company Ltd., Hong Kong (CN)

( * ) Notice: Subject to any disclaimer, the term of this patent is extended or adjusted under 35 U.S.C. 154(b) by 115 days.

(21) Appl. No.: 13/829,385

(22) Filed: Mar. 14, 2013

(65) Prior Publication Data
US 2014/0145417 A1    May 29, 2014

(30) Foreign Application Priority Data

Nov. 27, 2012  (CN) .......................... 2012 1 0490949

(51) Int. Cl.
*B62B 9/12* (2006.01)
*B62B 7/10* (2006.01)
*B62B 7/08* (2006.01)
*B62B 9/24* (2006.01)

(52) U.S. Cl.
CPC ... *B62B 7/08* (2013.01); *B62B 7/10* (2013.01); *B62B 9/245* (2013.01)

(58) Field of Classification Search
USPC .............. 280/642, 644, 647, 649, 650, 47.34, 280/47.38, 47.4
See application file for complete search history.

(56) References Cited

U.S. PATENT DOCUMENTS

| 4,515,389 | A |   | 5/1985  | Kassai |
|-----------|---|---|---------|--------|
| 5,257,799 | A |   | 11/1993 | Cone et al. |
| 5,447,319 | A | * | 9/1995  | Huang ..................... 280/87.051 |
| 5,947,555 | A | * | 9/1999  | Welsh et al. .................. 297/130 |
| 6,102,432 | A | * | 8/2000  | Cheng .......................... 280/642 |
| 7,281,732 | B2 | * | 10/2007 | Fox et al. ...................... 280/642 |
| 7,401,803 | B1 | * | 7/2008  | Lai ................................ 280/647 |
| 7,413,213 | B2 | * | 8/2008  | Pike et al. .................... 280/642 |
| 7,441,794 | B2 | * | 10/2008 | Lan .............................. 280/642 |
| 7,780,183 | B2 | * | 8/2010  | Chen et al. ................... 280/647 |
| 7,942,437 | B2 | * | 5/2011  | Moore .......................... 280/642 |

(Continued)

FOREIGN PATENT DOCUMENTS

CN     2592471   Y     12/2003
DE     19938564  A1    3/2001

OTHER PUBLICATIONS

Search Report issued in the corresponding GB case, Appl. No. GB1304226.2, dated Aug. 5, 2013, 4 pp.

*Primary Examiner* — Joseph Rocca
*Assistant Examiner* — Travis Coolman
(74) *Attorney, Agent, or Firm* — Holland & Hart LLP (57) ABSTRACT

A foldable stroller includes a stroller frame having two side frame portions, each of which includes a push rod, a leg rod, a pivot joint, and an armrest assembly including an armrest and an armrest folding device. The pivot joint has an upper joint member connected to the push rod, and a lower joint member connected to the leg rod. The armrest folding device includes: a connecting unit connected fixedly to the armrest, connected pivotally to the lower joint member, and having a guide slot formed therethrough; and a guide pin connected to the the upper joint member and extending through the guide slot. When the push rod is rotated relative to the leg rod, the guide pin moves between too opposite ends of the guide slot to thereby rotate the connecting unit relative to the lower leg rod.

11 Claims, 10 Drawing Sheets

(56) References Cited

U.S. PATENT DOCUMENTS

| | | | |
|---|---|---|---|
| 8,056,921 B2 * | 11/2011 | Dotsey et al. | 280/647 |
| 8,469,388 B2 * | 6/2013 | Moore | 280/642 |
| 8,602,442 B2 * | 12/2013 | Li | 280/647 |
| 2002/0175498 A1 * | 11/2002 | Yang et al. | 280/648 |
| 2012/0032419 A1 * | 2/2012 | Li | 280/647 |
| 2013/0140797 A1 * | 6/2013 | Fritz et al. | 280/649 |

* cited by examiner

ARMREST FOLDING DEVICE FOR A FOLDABLE STROLLER

CROSS-REFERENCE TO RELATED APPLICATION

This application claims priority of Chinese Application No. 201210490949.5, filed on Nov. 27, 2012.

BACKGROUND OF THE INVENTION

1. Field of the Invention

This invention relates to a foldable stroller, and more particularly to an armrest folding device for a foldable stroller.

2. Description of the Related Art

How to fold a stroller is important for design of a foldable stroller. A foldable stroller typically includes an armrest unit in consideration of safety of a child seated thereon. A looking device has been designed to lock an armrest on a stroller frame, and is operable to unlock the armrest from the stroller frame, thereby allowing the armrest to be folded. That is, operation of the locking device is required for folding of the foldable stroller, thereby resulting in difficulties during use of the foldable stroller.

SUMMARY OF THE INVENTION

The object of this invention is to provide an armrest folding device for a foldable stroller, which is configured such that an armrest can be automatically folded during folding of the stroller.

According to this invention, a foldable stroller includes a stroller frame having two side frame portions, each of which includes a push rod, a leg rod, a pivot joint, and an armrest assembly including an armrest and an armrest folding device. The pivot joint has an upper joint member connected to the push rod, and a lower joint member connected to the leg rod. The armrest folding device includes: a connecting unit connected fixedly to the armrest, connected pivotally to the lower joint member, and having a guide slot forced therethrough; and a guide pin connected to the the upper joint member and extending through the guide slot. When the push rod is rotated relative to the leg rod, the guide pin moves between two opposite ends of the guide slot to thereby rotate the connecting unit relative to the lower leg rod.

As such, when the push rod is rotated relative to the leg rod, an angle formed between any two of the arm, the push rod, and leg rod can be changed, so that the armrest can be folded and unfolded without any operation of the armrest folding device by the user. That is, the folding and unfolding processes of the foldable stroller are simplified.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
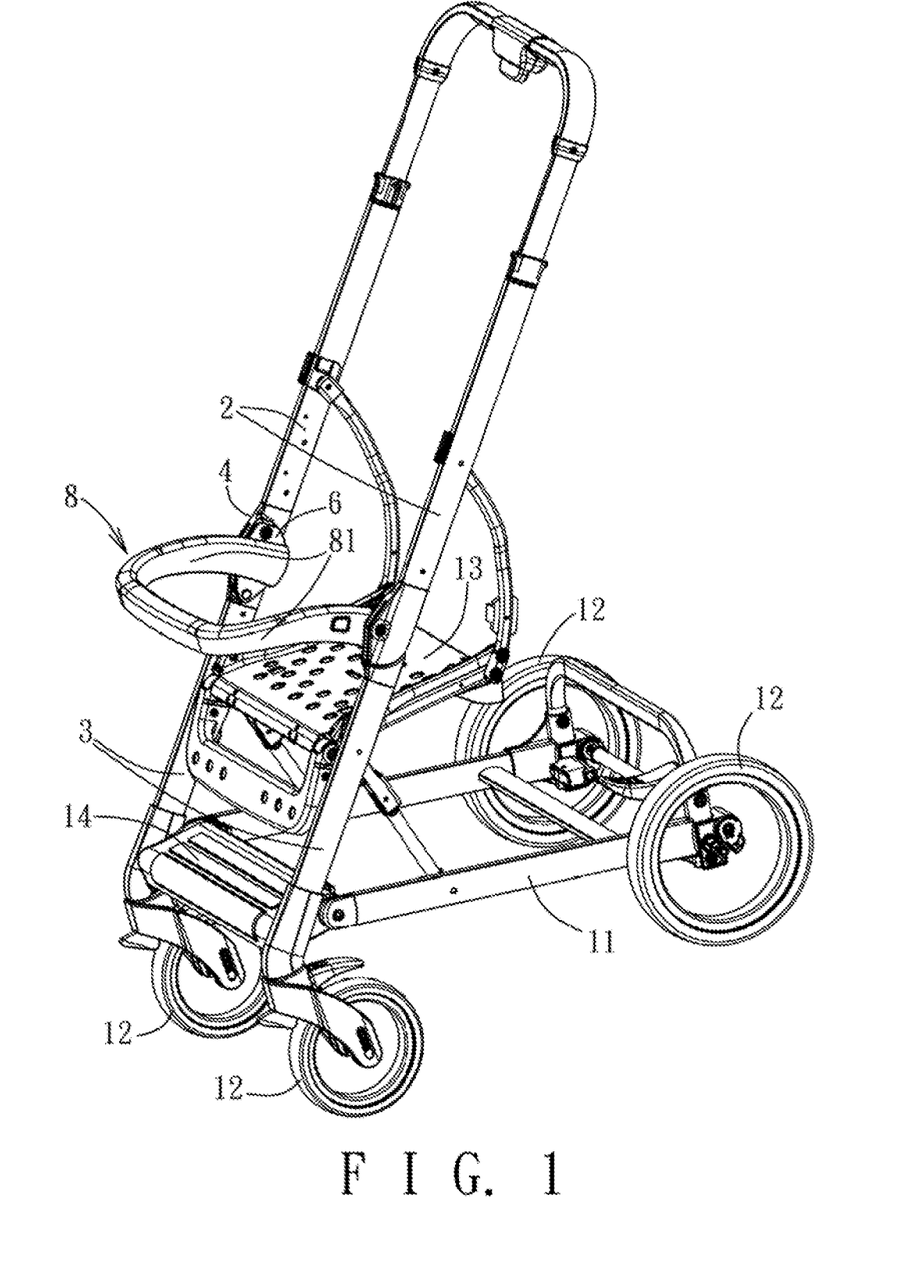
FIG. 1 is a perspective view of the preferred embodiment of a foldable stroller according to this invention when it is an unfolded state.

Referring to FIG. 1, the preferred embodiment of a foldable stroller according to this invention includes a bottom frame 11, two leg rods 3 connected respectively to front ends of two horizontal rails or the bottom frame 11, two push rods 2 connected respectively end pivotally to and disposed above the two leg rods 3, a seat 13 disposed between the leg rods 3, a footrest 14 connected between the two horizontal rails of the bottom frame 11 and between lower ends of the leg rods 3, four wheels 12 disposed respectively on the lower ends of the leg rods 3 and rear ends of the two horizontal rails of the bottom frame 11, and two armrest assemblies 8 each including an armrest 81 and an armrest folding device.

Figure 2:
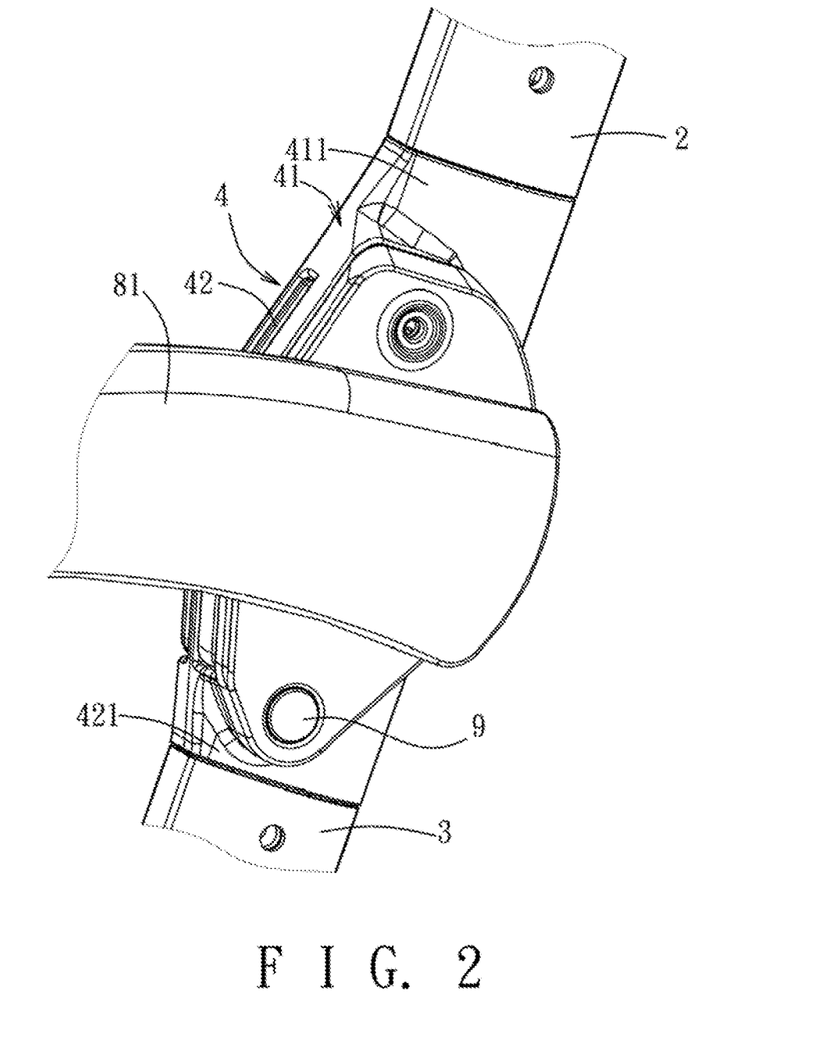
FIG. 2 is a fragmentary perspective view of the preferred embodiment, illustrating an armrest folding device.
Figure 3:
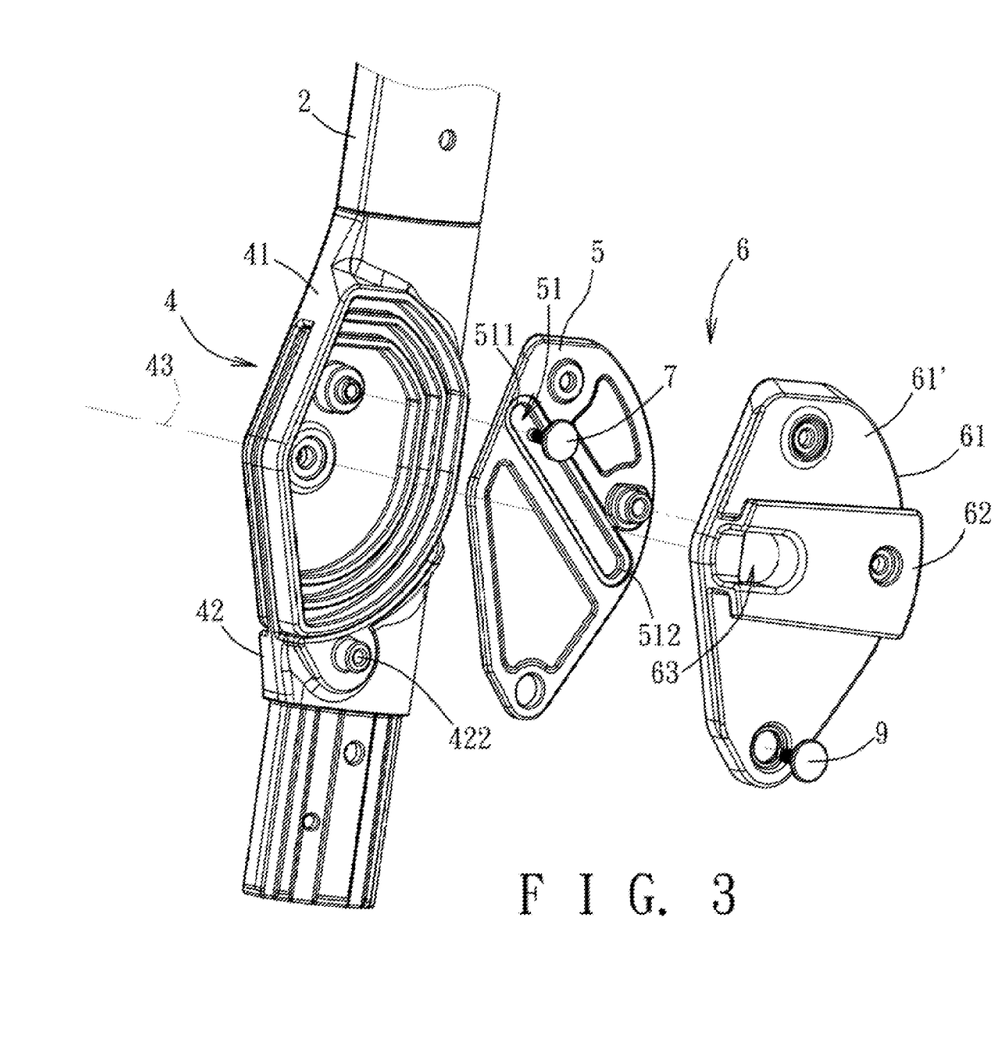
FIG. 3 is an exploded perspective view of the armrest folding device of the preferred embodiment.
Figure 4:
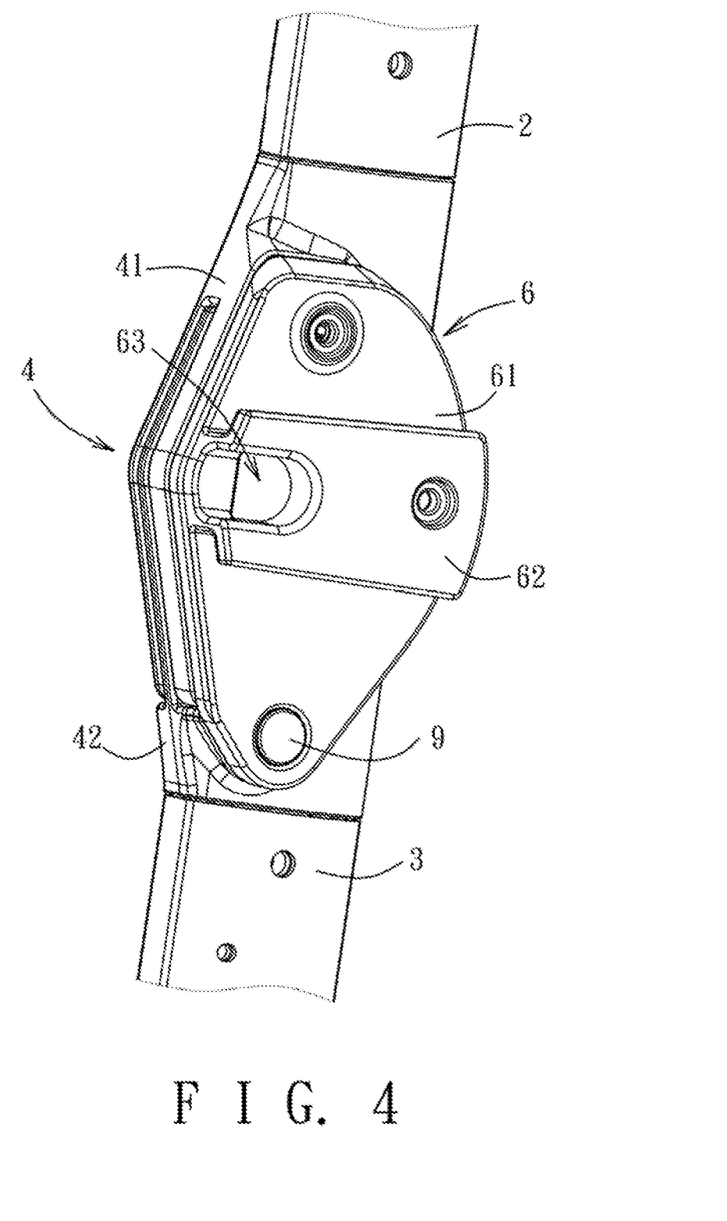
FIG. 4 is a perspective view of the armrest folding device of the preferred embodiment.

With further reference to FIGS. 2, 3, and 4, the push rod 2 and the leg rod 3 at the same side are interconnected by a pivot joint 4. The pivot joint 4 includes upper and lower joint members 41, 42 connected respectively to the push rod 2 and the leg rod 3. Each of the upper joint members 41 has an upper connecting portion 411 disposed at an upper end thereof and connected to the corresponding push rod 2. Each of the lower joint members 42 has a lower connecting portion 421 disposed at a lower end thereof and connected to the corresponding leg rod 3. A lower end of each of the upper joint members 41 is connected to an upper end of the corresponding lower joint 42, such that they are rotatable about a pivot axis 43. The armrest folding devices are disposed respectively on the pivot joints 4. since the stroller frame of the foldable stroller has two symmetric side frame portions, only one of the side frame portions will be described hereinafter.

Each of the armrest folding devices includes a connecting unit 6 and a guide pin 7.

With particular reference to FIG. 3, the connecting unit 6 includes an armrest-connecting member 61 and a joint-connecting member 5 connected pivotally to the lower joint member 42. The armrest-connecting member 61 is sleeved fixedly on the joint-connecting member 5. In this embodiment, the armrest-connecting member 61 is connected fixedly to the joint-connecting member 5 by two rivets (not shown). A pivot pin 9 extends through the armrest-connecting member 61 and the joint-connecting member 5, and is threaded in a hole 422 in the lower joint member 42, so that the armrest-connecting member 61 and the joint-connecting member 5 are rotatable about the pivot pin 9. The joint-connecting member 5 has a guide slot 51 formed therethrough and disposed above the pivot pin 9. The guide pin 7 extends through the guide slot 51 to connect fixedly with the upper joint member 41 at an end thereof. An opposite end of the guide pin 7 has a diameter greater than the width of the guide slot 51 to confine the guide pin 7 within the guide slot 51. When the upper and lower joint members 41, 42 are rotated relative to each other, the guide pin 7 moves within the guide slot 51 to rotate the armrest-connecting member 61 and the joint-connecting member 5 relative to the lower joint member 42 about the pivot pin 9 and the hole 422. Hence, the joint-connecting member 5 rotates relative to each of the upper and lower joint members 41, 42 by a predetermined angle to rotate the armrest 81 relative to the push rod 2 and the leg rod 3 between an unfolded position and a folded position.

Figure 5:
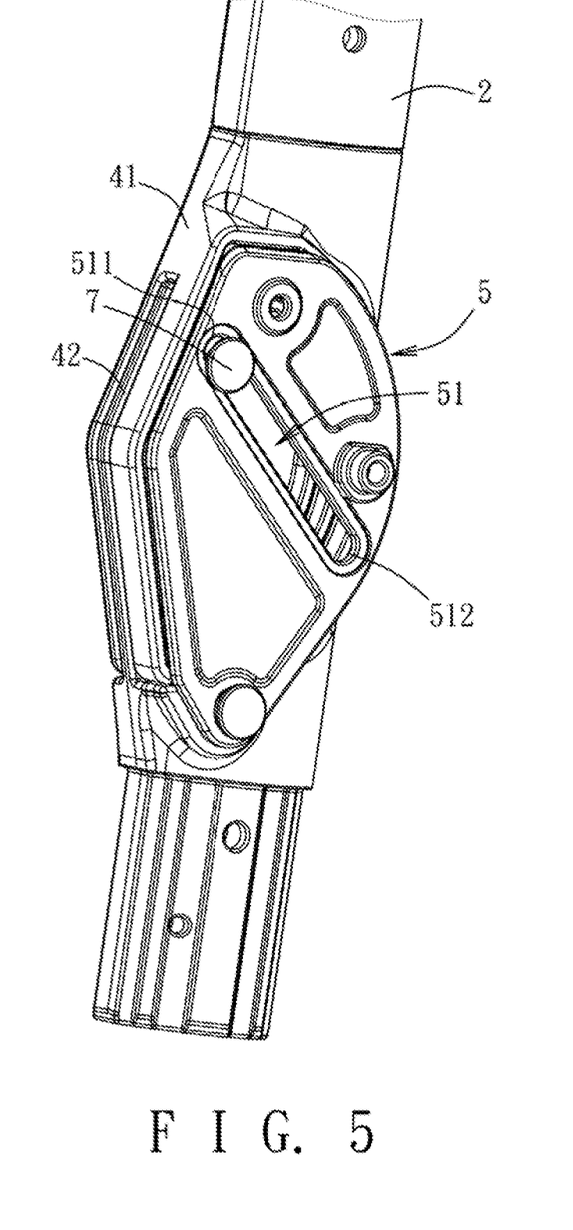
FIG. 5 is a fragmentary perspective view of the armrest folding device of the preferred embodiment when it is in an enfolded state.
Figure 6:
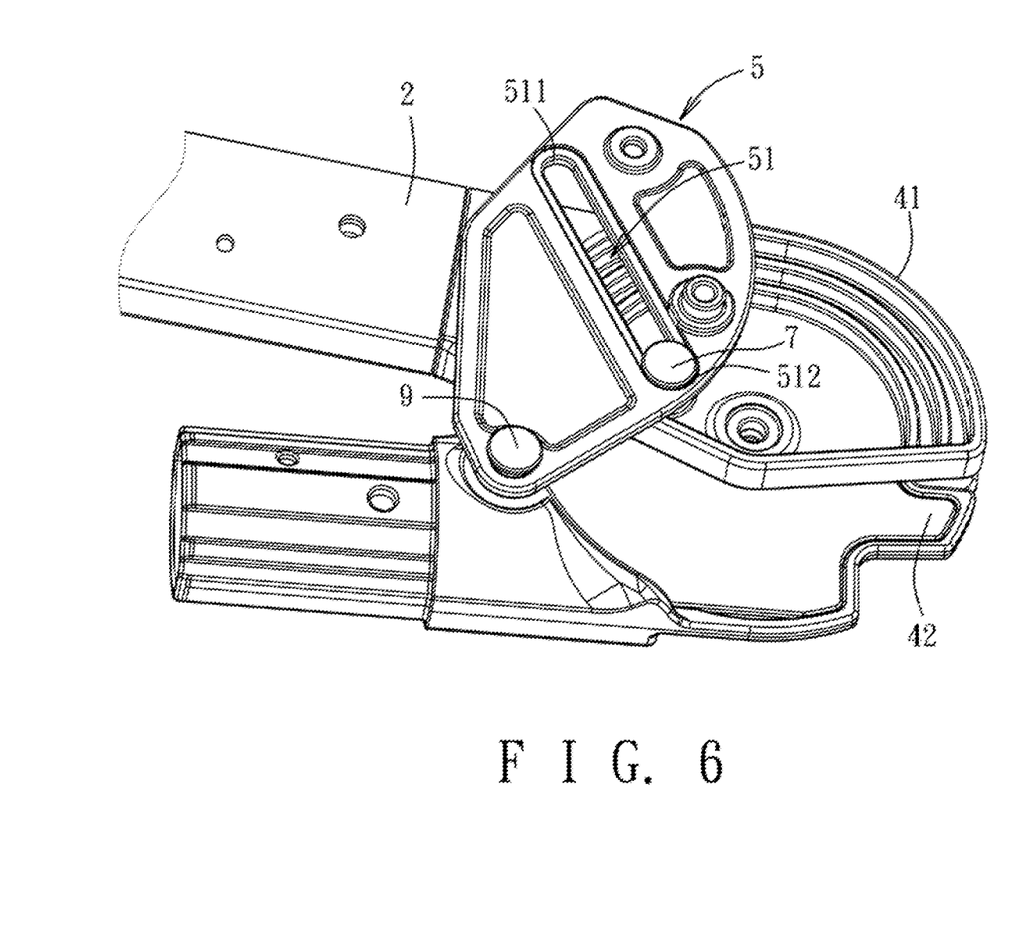
FIG. 6 is a fragmentary perspective view of the armrest folding device of the preferred embodiment when it is in a folded state.
Figure 7:
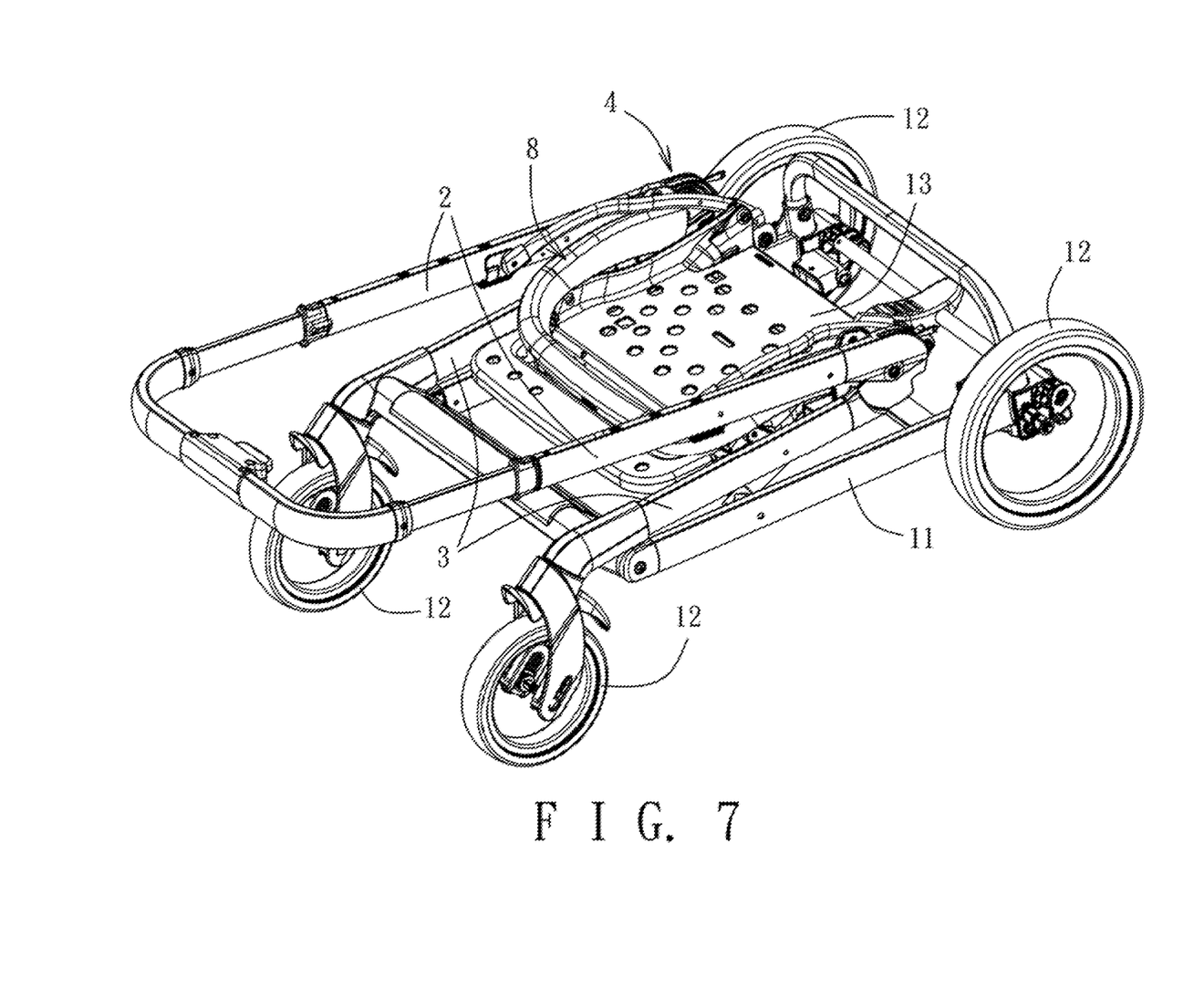
FIG. 7 is a perspective view of the preferred embodiment when it is in a folded state.

With particular reference to FIGS. 5 and 6, the guide slot 51 has first and second ends 511, 512. The distance between the first end 511 and the pivot pin 9 is greater than that between the second end 512 and the pivot pin 9. When the stroller is in an unfolded state, the guide pin 7 is disposed at the first end 511, as shown in FIG. 5. When the stroller is converted from the unfolded state to a folded state shown in FIG. 7, the push rod 2 is rotated relative to the leg rod 3 to thereby move the guide pin 7 from the first end 511 to the second end 512, as shown in FIG. 6.

With particular reference to FIGS. 3 and 4, the armrest-connecting member 61 has a plate body 61', an engaging projection 62 extending from a side surface of the plate body 61', and a locking hole 63 formed through the engaging projection 62 and the plate body 61'.

Figure 8:
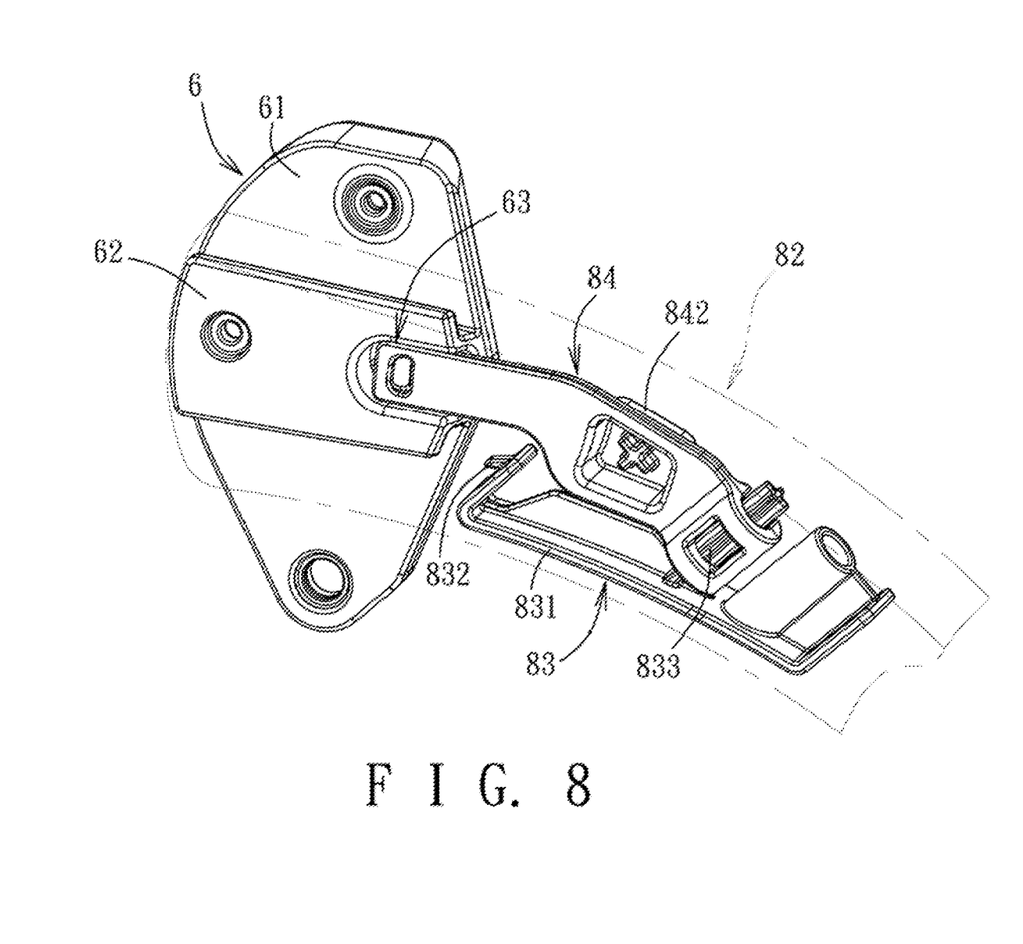
FIG. 8 is a perspective view of a connecting unit and an armrest of the preferred embodiment, an armrest body of the armrest being shown in phantom lines.
Figure 9:
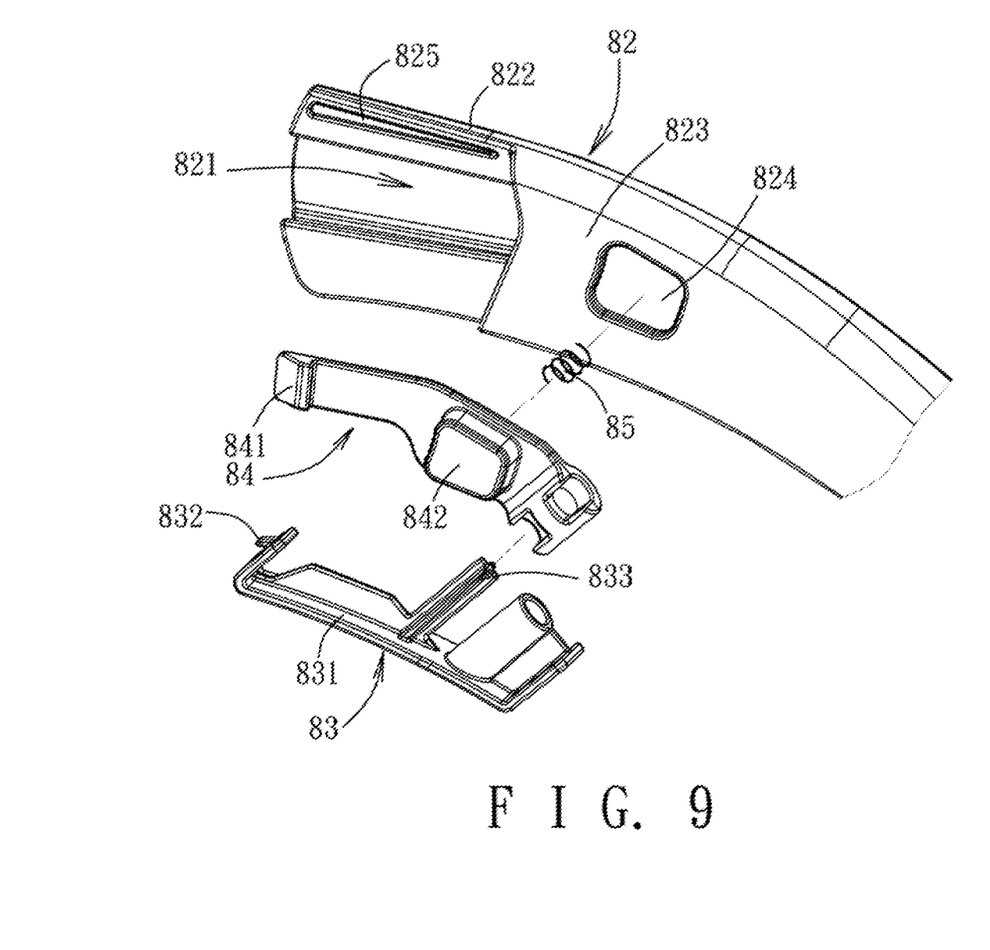
FIG. 9 is an exploded perspective view of the armrest of the preferred embodiment.
Figure 10:
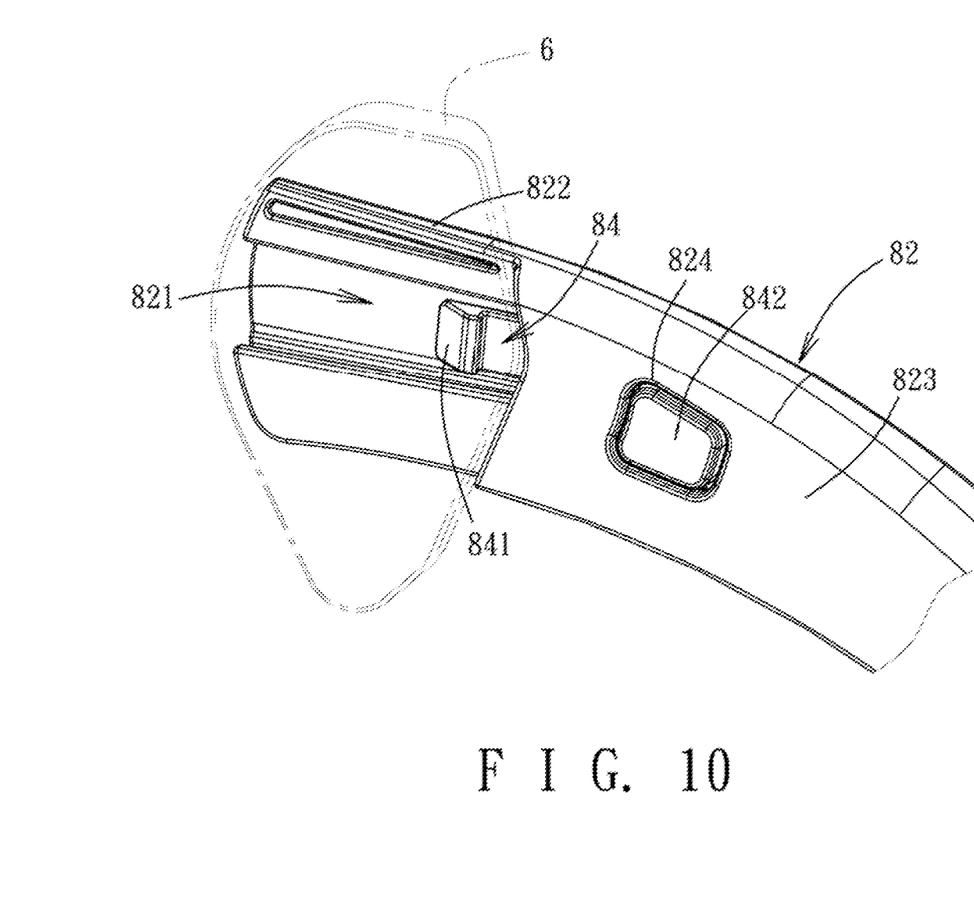
FIG. 10 is a perspective view of the connecting unit and the armrest of the preferred embodiment, the connecting unit being shown in phantom lines.

With further reference to FIGS. 8, 9, and 10, the armrest 81 includes an armrest body 82, a mounting member 83, a locking member 84, and a return spring 85. The armrest body 82 has a first sidewall 822 and a second sidewall 823 that are spaced apart from each other. The first sidewall 822 is formed with an engaging groove 821 for engaging the engaging projection 62, and a tapered groove 825. The second sidewall 823 is formed with an opening 824 allowing for accession to the locking member 84, so as to operate the locking member 84.

The mounting member 83 is disposed fixedly between the first and second sidewalls 822, 823 of the armrest 82, and includes a base portion 831, an anchoring hook 832 disposed at an end of the base portion 831 one engaging the tapered groove 825, and a positioning shaft post 833 disposed at an opposite end at the base portion 831.

The locking member 84 is sleeved rotatably on the positioning shaft post 833, and has an operating pushbutton 842 extending outwardly from the opening 824, and a hook portion 841 engaging removably the locking hole 63. By pressing the operating pushbutton 842, the locking member 84 is pivotable to remove the hook portion 841 from the locking hole 63.

The return spring 85 is disposed between the operating pushbutton 842 and the first sidewall 822 for biasing the locking member 84 to maintain engagement between the hook portion 841 and the locking hole 63. When it is desired to remove the armrest 81 from the connecting unit 6, it is only necessary to press the operating pushbutton 842. Subsequently, the armrest 81 can be pulled outwardly to move on the engaging projection 62 to separate from the connecting unit 6.

In view of the above, when the push rod 2 is rotated relative to the leg rod 3 to drive rotation of the upper and lower joint members 41, 42 relative to each other, the guide pin 7 is moved within the guide slot 51 to rotate the joint-connecting member 5 and the armrest-connecting member 61 relative to the lower joint member 42 by an angle, thereby unfolding or folding the armrest 81. In this manner, the folding process of the foldable stroller is simplified.

With this invention thus explained, it is apparent that numerous modifications and variations can be made without departing from the scope and spirit of this invention. It is therefore intended that this invention be limited only as indicated by the appended claims.

I claim:

1. A foldable stroller comprising a stroller frame having two side frame portions, each of which includes a push rod, a leg rod, a pivot joint, and an armrest assembly including an armrest and an armrest folding device, said pivot joint having an upper joint member connected to said push rod, and a lower joint member connected between said leg rod and said upper joint member, said armrest folding device including a connecting unit connected to said armrest, connected pivotally to said lower joint member, and having a guide slot formed therethrough; and a guide pin connected to said upper joint member and extending through said guide slot; wherein when said push rod is rotated relative to said leg rod, said guide pin moves along and within said guide slot to thereby rotate said connecting unit relative to said leg rod;

wherein said connecting unit includes an armrest-connecting member and a joint-connecting member connected pivotally to said lower joint member and pivotable relative to said lower joint member about a pivot axis, said armrest-connecting member being sleeved fixedly on said joint-connecting member, said guide slot being formed in said joint-connecting member;

wherein said armrest-connecting member is connected removably to said armrest;

wherein said armrest-connecting member has a locking hole formed therethrough, said armrest including a locking member having a hook portion that engages removably said locking hole; and wherein said armrest-connecting member further has an engaging projection, said armrest further including an armrest body, said armrest body having a first sidewall and a second sidewall that are spaced apart from each other, said first sidewall having an inner surface formed with an engaging groove for engaging said engaging projection.

2. The foldable stroller as claimed in claim 1, wherein said second sidewall of said armrest body is formed with an opening allowing for access to said locking member therethrough, so as to operate said locking member.

3. The foldable stroller as claimed in claim 2, wherein said locking member is disposed between said first and second sidewalls of said armrest body, and has an operating pushbutton extending outwardly from said opening, said armrest further including a return spring that is disposed between said operating pushbutton and said first sidewall for biasing said locking member to maintain engagement between said hook portion and said locking hole.

4. The foldable stroller as claimed in claim 3, wherein said armrest further includes a mounting member disposed between said first and second sidewalls of said armrest body, said first sidewall having a tapered groove formed therethrough, said mounting member having a base portion, an anchoring hook disposed at an end of said base portion and engaging said tapered groove, and a positioning shaft post disposed at an opposite end of said base portion, said locking member being sleeved rotatably on said positioning shaft post and being pivotable to remove said hook portion from said locking hole when said operating pushbutton is pressed.

5. The foldable stroller as claimed in claim 1, wherein said guide slot includes first and second ends, said guide pin being adjacent to said first end when said push rod and said leg rod are unfolded from each other, said guide pin being adjacent to said second end when said push rod and said leg rod are folded on each other.

6. The foldable stroller as claimed in claim 1, wherein said upper joint membership has an upper connecting portion disposed at an upper end thereof and connected to said push rod, said lower joint membership having a lower connecting portion disposed at a lower end thereof and connected to said leg rod, said upper and lower joint members being interconnected pivotally.

7. A foldable stroller comprising a stroller frame having two side frame portions, each of which includes a push rod, a leg rod, a pivot joint, and an armrest assembly including an armrest and an armrest folding device, said pivot joint having an upper joint member connected to said push rod, and a lower joint member connected between said leg rod and said upper joint member, said armrest folding device including a connecting unit connected pivotally to said lower joint member and connected to said armrest such that, when said push rod is rotated relative to said leg rod, an angle formed between any two of said armrest, said push rod, and leg rod can be changed;

wherein said connecting unit has a guide slot formed therethrough, said armrest folding device further including a guide pin connected to said upper joint member and extending through said guide slot such that, when said push rod is rotated relative to said leg rod, said guide pin is moved between two opposite ends of said guide slot to rotate said connecting unit relative to said push rod and said leg rod;

wherein said connecting unit includes an armrest-connecting member connected to said armrest, and a joint-connecting member connected pivotally to said lower joint member and rotatable relative to said lower joint member about a pivot axis, said armrest-connecting member being sleeved fixedly on said joint-connecting member, said guide slot being formed in said joint-connecting member;

wherein said armrest-connecting member has a locking hole formed threrethrough, said armrest including a locking member having a hook portion that engages removably said locking hole; and wherein said armrest-connecting member further has an engaging projection, said armrest further including an armrest body, said armrest body having a first sidewall and a second sidewall that are spaced apart from each other, said first sidewall having an inner surface formed with an engaging groove for engaging said engaging projection.

8. The foldable stroller as claimed in claim 7, wherein said second sidewall of said armrest body is formed with an opening allowing for access to said locking member therethrough, so as to operate said locking member.

9. The foldable stroller as claimed in claim 8, wherein said locking member is disposed between said first and second sidewalls of said armrest body, and has an operating pushbutton extending outwardly from said opening, said armrest further including a return spring that is disposed between said operating pushbutton and said first sidewall for biasing said locking member to maintain engagement between said hook portion and said locking hole.

10. The foldable stroller as claimed in claim 9, wherein said armrest further includes a mounting member disposed between said first and second sidewalls of said armrest body, said first sidewall having a tapered groove formed therethrough, said mounting member having a base portion, an anchoring hook disposed at an end of said base portion and engaging said tapered groove, and a positioning shaft post disposed at an opposite end of said base portion, said locking member being sleeved rotatably on said positioning shaft post and being rotatable to remove said hook portion from said locking hole when said operating pushbutton is pressed.

11. The foldable stroller as claimed in claim 7, wherein said upper joint member has an upper connecting portion disposed at an upper end thereof and connected to said push rod, said lower joint member having a lower connecting portion disposed at a lower end thereof and connected to said leg rod, said upper and lower joint members being interconnected pivotally.

* * * * *